United States Patent [19]

Kang et al.

[11] Patent Number: 5,652,327

[45] Date of Patent: Jul. 29, 1997

[54] TRIAZINE POLYMERS

[75] Inventors: Wen-Bing Kang, Kawagoe; Tsunetoshi Sugiyama, Higashimatsuyama; Shizuo Ogura, Tsurugashima; Yusuke Takano, Tokyo, all of Japan

[73] Assignee: Hoechst Aktiengesellschaft, Frankfurt, Germany

[21] Appl. No.: 386,886

[22] Filed: Feb. 10, 1995

[30] Foreign Application Priority Data

Feb. 14, 1994 [JP] Japan ..................... 6-017408

[51] Int. Cl.$^6$ .............. C08G 73/06; C08F 26/06; C08F 126/06
[52] U.S. Cl. .............. 528/327; 528/422; 528/423; 526/258; 526/263
[58] Field of Search ...................... 526/258, 263; 528/327, 422, 423

[56] References Cited

U.S. PATENT DOCUMENTS

| | | | |
|---|---|---|---|
| 4,347,352 | 8/1982 | Wesseler | 528/423 |
| 4,779,961 | 10/1988 | De Martino | 526/263 |
| 4,801,670 | 1/1989 | De Martino et al. | 526/263 |
| 4,808,332 | 2/1989 | De Martino et al. | 526/312 |
| 4,865,430 | 9/1989 | De Martino et al. | 526/312 |
| 4,913,844 | 4/1990 | De Martino | 526/326 |
| 5,045,364 | 9/1991 | Fang | 428/411.1 |

FOREIGN PATENT DOCUMENTS

| | | |
|---|---|---|
| 0492501 | 7/1992 | European Pat. Off. . |
| 3010749 | 10/1980 | Germany . |
| WO88/04305 | 6/1988 | WIPO . |

OTHER PUBLICATIONS

Applied Physics Letters, vol. 60, No. 10, Mar. 9, 1992, pp. 1158–1160 by S. Tatsuura et al. entitled "Epoxy–amine Polymer Waveguide Containing Nonlinear Optical Molecules Fabricated by Chemical Vapor Deposition".

CA 95(8):62957n "Polymers containing atriazine ring", Kanesafuchi, Aug. 24, 1981.

*Primary Examiner*—Samuel A. Acquah
*Assistant Examiner*—P. Hampton-Hightower
*Attorney, Agent, or Firm*—Curtis, Morris & Safford, P.C.

[57] ABSTRACT

A polymer containing triazine rings that has a molecular weight of 5,000–1,000,000 and that comprises a recurring unit represented by the general formula (I):

wherein $X^1$ and $X^2$ are each independently S, $NR^1$ (R is a hydrogen atom, an alkyl group or an aryl group) or O; Y may be an alkylene group, a divalent substituted or unsubstituted aromatic ring group that do not contain chromophore moieties or a group in which said aromatic ring groups are bonded or condensed together; Z is either a spacer group comprising a group represented by $-G-(CH_2)_n-$ (n is an integer of 1–10) or a direct bond (G is S, $NR^4$ or O, and $R^4$ is a hydrogen atom, an alkyl group or an aryl group); and A is an organic chromophore moiety in which an electron donative group and an electron attractive group are conjugated via a π-electron system. The polymer is lightproof, forms a thin film of high quality and has a high glass transition point.

17 Claims, No Drawings

TRIAZINE POLYMERS

BACKGROUND OF THE INVENTION

This invention relates to a polymer having triazine rings (the polymer is hereunder referred to as "a triazine polymer"). More particularly, the invention relates to a triazine polymer that has a chromophore moiety, especially one having nonlinear optical activity of second or third order introduced into a polymer having triazine rings. The invention also relates to nonlinear optical devices such as optical harmonic wave generators and electrooptic devices that use said triazine polymer.

Nonlinear optical materials are today drawing increasing attention in the field of opto-electronics. Nonlinear optical materials are those materials which interact with light to exhibit a nonlinear optical response. Second-order nonlinear optical effects are exemplified by second harmonic generation (SHG) and the first-order electro-optical (EO) effect (Pockel's effect). Materials exhibiting these effects can be utilized in various devices such as frequency doubling of the laser light, electro-optical modulation and electro-optical modulation and electro-optical switching. Continuing efforts, therefore, are being made to study nonlinear optical devices exhibiting these effects.

Nonlinear optical materials conventionally known to exhibit the SHG effects are inorganic substances such as lithium niobate ($LiNbO_3$) and potassium titanyl phosphate (KTP). The studies heretofore made on devices that utilize the SHG and EO effects have also focused on these inorganic substances. In recent years, however, organic nonlinear optical materials having a conjugated π-electron system have drawn the increasing attention because of their large optical nonlinearity and fast optical response, and many studies are being conducted in a search for promising materials. Polymeric materials have particularly attracted the interest of many researchers for several reasons including good processability and high stability. Details about organic nonlinear optical materials may be found in, for example, (1) "Nonlinear Optical Properties of Organic and Polymeric Materials", ed. David J. Williams, ACS Symposium Series No. 233 (1983);
(2) "Nonlinear Optical Properties of Organic Molecules and Crystals", Vols. 1 and 2, ed. D. S. Chemla and J. Zyss, Academic Press (1987);
(3) "Yuki Hisenkei Kogaku Zairyo (Organic Nonlinear Optical Materials)", Masao Kato and Hachiro Nakanishi, CMC Press (1985); and
(4) "Shin-Yuki Hisenkei Kogaku Zairyo (Advanced Nonlinear Optical Organic Materials)" Vols. I and II, T. Kobayashi, M. Umegaki, H. Nakanishi and N. Nakamura, CMC Press (1991).

Among the known high polymeric organic nonlinear optical materials is one that has a dye dispersed in a polymer such as PMMA, with the polymer being then placed in an applied electric field as it is held at a temperature higher than its glass transition point so that the molecules of the dispersed dye are aligned in the same direction, whereby nonlinear optical activity is exhibited. However, nonlinear optical polymers of this host-guest type which have dyes dispersed in the polymer matrix have had limitations such as the incapability for increasing the dye concentration and fast relaxation of molecular alignment. Under the circumstances, recent studies of nonlinear optical high polymer materials are focused on those materials which have dyes bound chemically to either side chains or the backbone chain of polymers. Such high polymer materials allow for higher dye concentrations, feature good processability and experience less relaxation of molecular alignment. Typical examples of such polymers are those polymer materials which have stilbene- or azo-base chromophores bound as pendants to polymer side chains and which are taught in U.S. Pat. Nos. 4,779,961, 4,801,670, 4,808,332, 4,865,430, 4,913,844, etc. More specifically, U.S. Pat. No. 4,865,430 teaches a high polymeric nonlinear optical material using the polymer identified below:

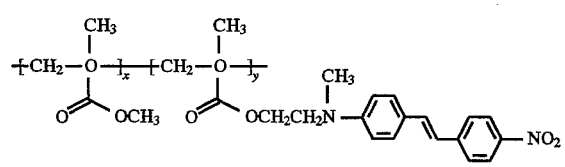

The high polymer materials under consideration allow for higher dye concentrations. But, generally speaking, they have comparatively low glass transition points (Tg) and are not suitable for use in applications that require materials having high Tg values. In addition, such high polymer materials will absorb light on account of the inherent aliphatic C—H bonds to cause a light transmission loss problem. To solve this problem, a method has been reviewed that introduces crosslinkable reactive groups into the high polymer and that increases its glass transition point by crosslinking those reactive groups in the polymer. An example of this method is taught in Japanese Laid-open Patent Publication No. 229838/92 (JP-A-04229838), according to which a crosslinkable triazine is subjected to crosslinking with the dye atomic groups in the high polymer being aligned in an applied electric field so as to produce a crosslinked nonlinear optical device. A problem with this method is that nonuniformity will occur since the crosslinking operation is performed with the dye atomic groups being aligned in an electric field.

SUMMARY OF THE INVENTION

Under the circumstances, it is the principal object of the present invention to provide a material that is lightfast, that forms a thin film of high quality and that has a high glass transition point.

This object can be attained by a polymer that has a triazine skeleton and which has a recurring unit represented by the following general formula (I). This triazine polymer is chemically stable at high temperatures and it yet has a high glass transition point; hence, it is capable of withstanding use under high-temperature conditions:

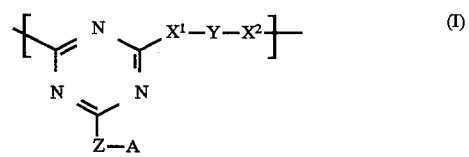

wherein $X^1$ and $X^2$ are independently S, $NR^1$ or O, wherein $R^1$ is hydrogen atom, an alkyl group or an aryl group; $R^1$ is preferably methyl, ethyl or a straight-chained or branched alkyl group having 3–5 carbon atoms.

Y is an alkylene group, a divalent substituted or unsubstituted aromatic ring group which does not have a chromophore moiety, a group in which said aromatic ring groups are together bonded or condensed, or a group represented by the formula (II):

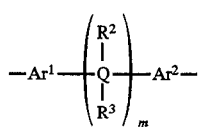
(II)

(the term "aromatic ring group" as used herein shall mean both an aromatic hydrocarbon ring group and an aromatic heterocyclic group).

In formula (II),

Ar$^1$ and Ar$^2$ are independently a divalent substituted or unsubstituted aromatic ring group, R$^2$ and R$^3$ are independently hydrogen atom or an alkyl group, Q is carbon atom or silicon atom, and m is an integer of 1 to 4;

In the formula (I),

Z is a spacer group comprising a group represented by the formula —G—(CH$_2$)$_n$—, or a direct bond, wherein n is an integer of 1 to 10, G is S, NR$^4$ or O wherein R$^4$ is hydrogen atom, an alkyl group or an aryl group;

In the formula (I),

A is an organic chromophore moiety in which an electron donative group and an electron attractive group are conjugated via a π-electron system, and it is the group the remains after the hydrogen atoms have been removed from the chromophore AH.

The triazine polymers of the present invention have weight average molecular weights of 5,000–1,000,000, preferably 8,000–300,000, and a wide scope of species ranging from oligomers of low molecular weights to polymers of high molecular weights can be synthesized.

Residue —ZA in general formula (I) which consists of the spacer group or direct bond and the chromophore moiety can be introduced into the triazine ring using the chromophore H—ZA. If Z in this chromophore is the spacer group, it is a group represented by —G—(CH$_2$)$_n$—, where G is S, NR$^4$ or O, and R$^4$ is a hydrogen atom, an alkyl group or an aryl group; R$^4$ is preferably a hydrogen atom, a methyl group, an ethyl group, or a straight-chained or branched alkyl group having 3–5 carbon atoms; and n is an integer of 1–10. In a particularly preferred case, G is O and n is 2 or 3.

The electron donative group in A may be S, NR$^5$ or O, with NR$^5$ being preferred; R$^5$ is a hydrogen atom, an alkyl group or an aryl group and it is preferably a hydrogen atom, a methyl group, an ethyl group or a straight-chained or branched alkyl group having 3–5 carbon atoms.

The electron attractive group in A may be a nitro group, an acyl group (e.g. acetyl, acryloyl or benzoyl), a cyano group, a sulfonyl group, a cyanovinyl group or a dicyanovinyl group preferably 2,2-dicyanovinyl).

The π-electron system coupling the electron donative and attractive groups is represented by —(Ar$^3$—L)$_p$—Ar$^4$—, where Ar$^3$ and Ar$^4$ are each independently a divalent aromatic ring group such as a phenylene group, a biphenylene group, a pyridine or a furan group. If desired, Ar$^3$ and/or Ar$^4$ may have the hydrogen atoms on the ring replaced by an alkyl group or a halogen or, alteratively, the rings may be fused together. Symbol p represents an integer of 0–10, preferably an integer of 0–2.

Symbol L represents the coupling group which conjugate Ar$^3$ and Ar$^4$ via a π-electron system; L may be an azo group, —N≡N—, an olefinic group represented by —(CH═CH)$_q$— (where q is an integer of 1–5), an alkyne group represented by —(C≡C)$_r$— (where r is an integer of 1–5), or an aromatic ring group such as a benzene ring, biphenyl stilbene, azobenzene or tolan, or a direct bond.

A preferred example of the group ZA is a π-electron conjugating system coupled by an azo or olefinic group, and more preferred examples are aminonitrostilbene and aminonitroazobenzene.

Typical examples of the group ZA are listed below.

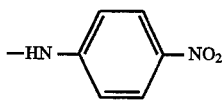
1)

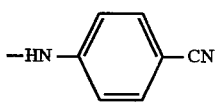
2)

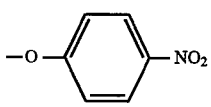
3)

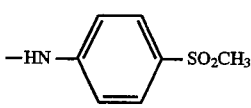
4)

5)

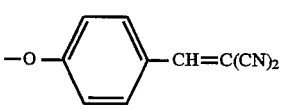
6)

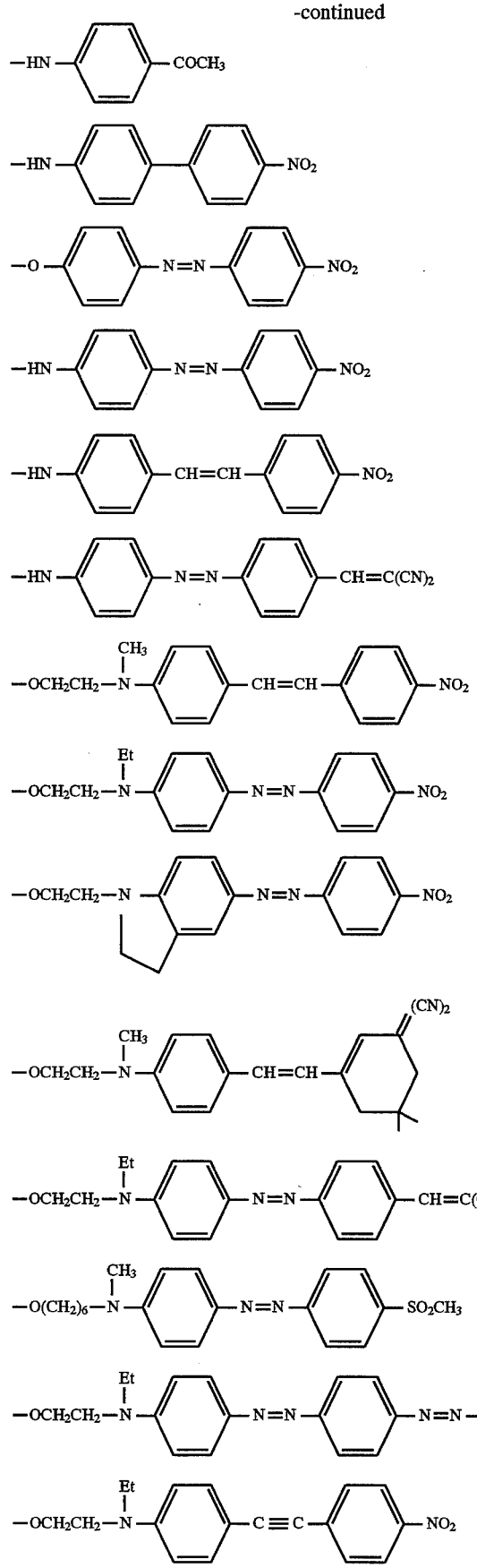

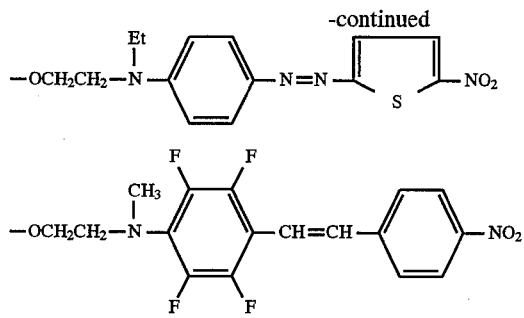
21)

22)

Among these examples of the group ZA, 13), 14), 15) and 19) are particularly preferred.

In the general formula (I), —$X^1$—Y—$X^2$— represents the portion that forms the backbone chain of the triazine polymer and $X^1$ and $X^2$ are each independently S, $NR^1$ or O, where $R^1$ is a hydrogen atom, an alkyl group or an aryl group; preferably, $R^1$ is a hydrogen atom, methyl, ethyl or a straight-chained or branched alkyl group having 3–6 carbon atoms. In a particularly preferred case, $X^1$ and $X^2$ are both C.

As already mentioned, Y is an alkylene group, a divalent substituted or unsubstituted aromatic ring group which does not have a chromophore moiety, a group in which said aromatic ring groups are bonded or condensed together, or a group represented by the formula (II):

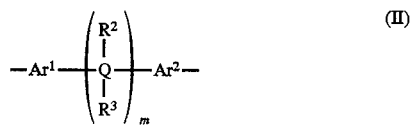

(II)

If Y is an alkylene group, it may be straight-chained or branched. The alkylene group has 2–10, preferably 2–4, carbon atoms. A particularly preferred alkyl group is ethylene or propylene.

If Y is a divalent aromatic ring group having no chromophore moiety, it may be an aromatic hydrocarbon ring group such as a phenylene group or an aromatic heterocyclic group such as a pyridine ring, a furan ring, a thiophene ring, a pyridazine ring, a pyrimidine ring or piperazine ring. The hydrogen atoms in these aromatic rings may be replaced by an alkyl group, an alkoxy group and/or a halogen, etc. A preferred aromatic ring group is a phenylene group, a pyrimidine ring group or a pyrazine ring group.

If Y is the product of bonding or condensation of said aromatic ring groups, the latter may be the same or different, with their preferred number being 2 or 3. Exemplary aromatic ring groups include naphthalene, quinoline, indoline and carbazole. A particularly preferred group as Y is 4,4′-(2,5-pyrazinylene)-diphenyl group.

If Y is represented by the formula (II), $Ar^1$ and $Ar^2$ in that formula may be exemplified by those which are the same as the aromatic ring groups already listed above; the hydrogen atoms in those aromatic rings may be replaced by an alkyl group, an alkoxy group and/or a halogen, etc.

If $R^2$ and/or $R^3$ in formula (II) is an alkyl group, the latter has preferably 1–12 carbon atoms and it may be straight-chained or branched; $R^2$ and $R^3$ are preferably methyl, ethyl, n-propyl or i-propyl; in a particularly preferred case, $R^2$ and $R^3$ are both methyl. Symbol m in formula (II) is preferably 1.

Specific examples of Y are listed below:

—$OCH_2CH_2O$— 1)

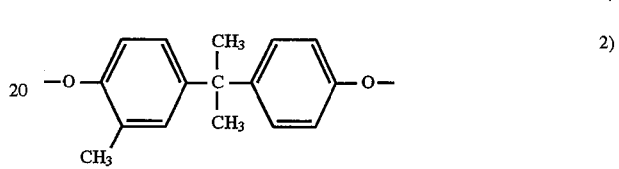 2)

—$HNCH_2CH_2NH$— 3)

—$OCH_2CHO$—
         |
         $CH_3$ 4)

 5)

—$OCH_2CH_2CH_2O$— 6)

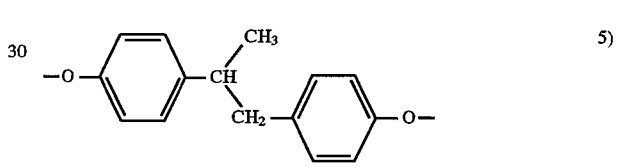 7)

 8)

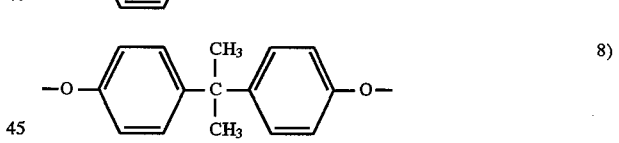 9)

 10)

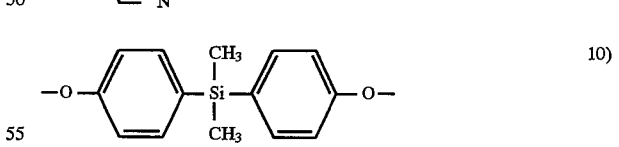 11)

 12)

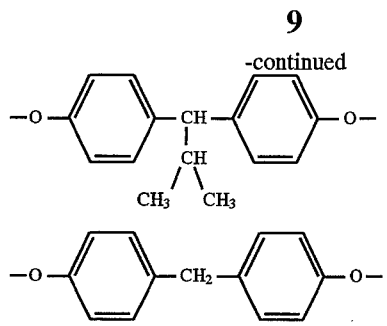

Among these, 1), 8) and 13) are particularly preferred.

The triazine polymers of the invention are preferably azo- and stilbene-based with the following chemical structures:

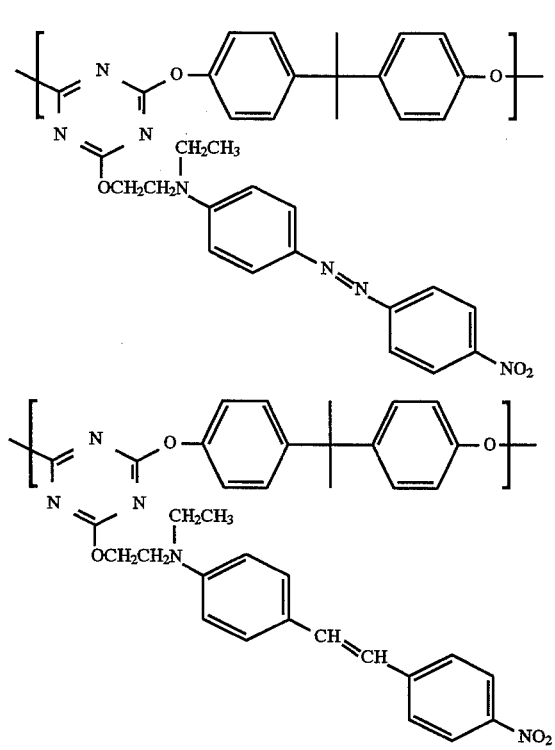

The triazine polymers of the invention can be synthesized by any known method, such as the one that starts from a dichlorotriazine derivative (i.e., trichlorotriazine having the chlorine atoms replaced by a chromophore) and diamine, bisphenol or dithiol. More specifically, the triazine polymers of the invention can be easily synthesized by a method that is represented by the following reaction scheme:

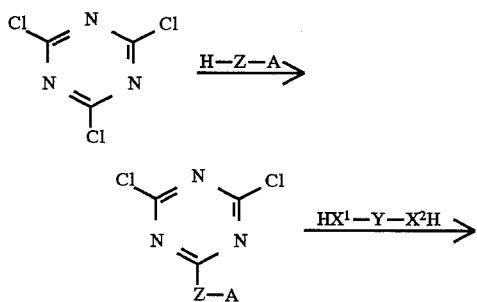

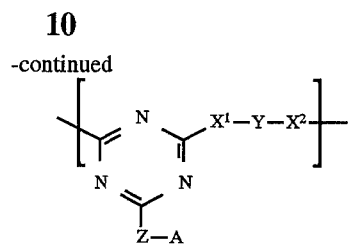

Further details of synthesis methods are described in III-6-02, III-6-03 and III-6-04 of the Preprints for the 1993 Conference of The Society of Polymer Science, Japan. The thus prepared triazine polymers can be processed into thin uniform films, which may in turn be placed in an electric field for molecular alignment to fabricate nonlinear optical devices having good heat stability.

The polymer of the invention may be a homopolymer comprising a recurring unit represented by the general formula (I) or it may be a copolymer comprising at least two recurring units represented by the general formula (I). Alternatively, the polymer may be a mixture of at least two triazine polymers. If desired, the triazine polymer of the invention may be mixed with other polymers. The polymer of the invention may also be a copolymer comprising a recurring unit represented by the general formula (I) and other polymer recurring units. Exemplary polymers include polyesters, polycarbonates, polyvinyl chloride, polyethers, polyacrylates, polymethacrylates, polystyrenes, polyolefins and polyvinyl carbazole. The polymer of the invention is preferably a homopolymer or a copolymer that is solely composed of recurring units represented by the general formula (I).

The triazine polymers of the invention have nonlinear optical effects and, hence, are useful as nonlinear optical devices including wavelength converting devices, waveguide devices and other devices that make use of electro-optic effects.

When fabricating a waveguide device using the triazine polymer of the invention, the latter may be dissolved in a suitable solvent such as THF, DMF, NMP or cyclohexanone and the resulting solution is spin coated or otherwise applied to a substrate such as a silicon substrate and, subsequently, the solvent is removed to form a thin film, followed by alignment of the chromophore moiety in an applied electric field by a known method.

If desired, a fiber-type nonlinear optical device can be fabricated by using the triazine polymer of the invention in the core of fiber optics. To this end, the triazine polymer in a molten state may be injected into the core of hollow fiber optics and the chromophore moiety aligned in an applied electric field at a temperature higher than the glass transition point of the polymer.

The thusly fabricated nonlinear optical devices are useful as second-order nonlinear optical processing devices and wavelength conversion devices such as optical frequency multiplying devices. With such wavelength conversion devices, the wavelength of light such as laser light can be converted by angular or temperature phase matching. To generate fundamental waves, solid lasing media such as Nd:YAG or Nd:YVO$_4$ excited by semiconductor lasers may be used; alternatively, semiconductor lasers may be directly used to attain the same purpose.

The electrooptical constants of the triazine polymers of the present invention can be measured by various methods such as the one described in C. C. Teng and T. T. Man, Appl. Phys. Lett., 56(18), 30 Apr. 1990.

The following examples are provided for the purpose of further illustrating the polymers to be used in the invention but they are by no means intended to limit the scope of the invention.

EXAMPLE 1

Synthesis of a Triazine Polymer Having A Pendant Group of Nitrophenylamino Group

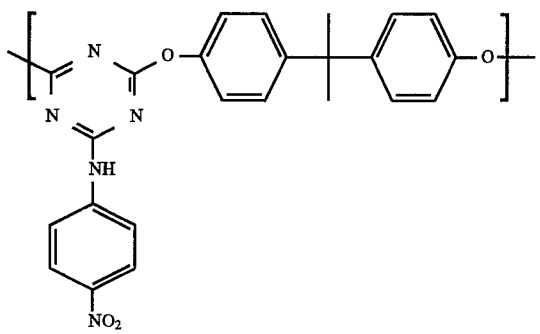

Para-nitroaniline (13.8 g) was dissolved into acetone (150 ml) at room temperature. 2,4,6-Trichlorotriazine (18.4 g) was dissolved into acetone (100 ml). Then the trichlorotriazine solution was dropwisely added to the p-nitroaniline solution as the p-nitroaniline solution was cooled with iced water. After the reaction was carried out for 2 hours at 0° C., an aqueous sodium bicarbonate solution (8.4 g of sodium bicarbonate being dissolved in 100 ml of water) was dropwisely added to the solution over 30 minutes. Then, the cooling was stopped by removing the ice bath and the solution was stirred until the temperature of the solution became room temperature. The reaction product was filtered off, washed with water and vacuum dried to obtain 23 g of 2,4-dichloro-6-p-nitroanilinotriazine. The chemical structure of the reaction product was confirmed by NMR and the melting point.

Bisphenol A (4.58 g) was dissolved in dimethylformamide (60 ml) at room temperature and allowed to cool to 0° C. with iced water. An aqueous potassium hydroxide solution (2.25 g of potassium hydroxide being dissolved in 10 ml of water) was added to the solution. Then, a powder of 2,4-dichloro-6-p-nitroanilinotriazine (5.72 g) was added to the solution. The cooling was stopped by removing the cited water and the solution was allowed to react for 16 hours at room temperature and subsequently for 10 hours at 80° C. After cooling the solution, water was added to the solution to precipitate a solid, and the solid precipitate was filtered off and washed with water. Subsequently, the precipitate was dissolved in 150 ml of tetrahydrofuran and this solution was dropwisely added to 250 ml of methanol to precipitate a solid. The solid precipitate thus obtained was filtered off, washed with methanol and vacuum dried to obtain 7.8 g of a triazine polymer having a pendant group of nitrophenylamino group. The structure of the triazine polymer was confirmed by elemental analysis and NMR.

UV-visible spectra: $\lambda_{max}$=331 nm (chloroform)

Glass transition temperature analyzed by DSC: 230° C. (in a nitrogen atmosphere, rate of temperature increase 20° C./min)

Thermal decomposition temperature analyzed by TGA: 310° C. (in air, rate of temperature increase 20° C./min)

Molecular weight analyzed by GPC (solvent: THF, standard: polystyrene): Mw=28800, Mn=21600, Mw/Mn= 1.33

EXAMPLE 2

Measurement of Triazine Polymer's Electrooptical Constant

The triazine polymer of Example 1 was dissolved in cyclohexanone (15% by weight). Then, the solution was passed by suction through a filter having a diameter of 0.2 microns.

The solution was spin-coated onto a glass substrate on which ITO had been deposited. The substrate was allowed to dry for 5 hours at 160° C. to evaporate the solvent. The thus obtained thin film had a thickness of 10 microns as measured with a probe-type thickness gage.)

Then, an electrode for orientating the chromophore moieties in the triazine polymer was provided on the thin film by depositing gold thin film of a round shape having a thickness of about 1000 Å and a diameter of 5 mm. The gold electrode and the ITO electrode were bonded with silver paste to electric wires for connection to a power source.

The substrate was disposed on a hot plate and the hot plate was heated to a temperature above the glass transition point of the triazine polymer (240° C.). After providing the chromophore moieties with sufficient mobility, a voltage of 100 V/μm was applied between the gold electrode and the ITO electrode. While the voltage was applied the thin film was allowed to cool to room temperature so as to fix the orientation of the chromophore moieties in the triazine polymer. The thus obtained thin film exhibited high transparency and had no defects.

The electro-optical constant (r) of the triazine polymer film was 2 pm/V at 633 nm.

EXAMPLE 3

Synthesis of a Triazine Polymer Having a Pendant Group of Acetylphenylamino Group

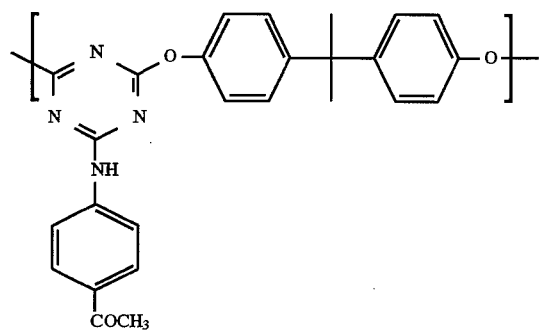

Para-aminoacetophenone (6.75 g) was dissolved into acetone (80 ml) at room temperature. 2,4,6-Trichlorotriazine (9.2 g) was dissolved into acetone (50 ml). Then the trichlorotriazine solution was dropwisely added to the aminoacetophenone solution as the latter was cooled with iced water. After the reaction was carried out for 2 hours at 0° C., an aqueous sodium bicarbonate solution (4.2 g of sodium bicarbonate being dissolved in 50 ml of water) was dropwisely added to the solution over 20 minutes. Then, the cooling was stopped by removing the ice bath and the solution was stirred until the temperature of the solution became room temperature. The reaction product was filtered off and washed with water to yield a crude product, which was used in the subsequent reaction without being purified.

Bisphenol A (10.27 g) was added to a solution of potassium hydroxide (2.53 g) in water (10 ml) at room temperature. After adding 2-methylpyrrolidone (100 ml), the resulting solution was cooled to 0° C. with ice water. Then, the powder of the separately prepared crude powder of 2,4-dichloro-6-p-acetylphenylaminotriazine was added to the cooled solution. Thereafter, the ice water bath was removed and reaction was carried out at room temperature for 10 h, then at 50° C. for 3 h, at 80° C. for 3 h and finally at 100° C. for 10 h. After cooling, the reaction solution was poured into water and the resulting precipitate was filtered and washed with water. Further, the solid precipitate was dissolved in tetrahydrofuran (150 ml) and the solution was added dropwise to methanol (250 ml). The resulting precipitate was filtered, washed with methanol and vacuum dried to yield 15 g of the titled triazine polymer containing acetylphenylamino pendant groups. The polymer was verified as the desired product by elemental analysis and NMR.

UV-visible spectra: $\lambda_{max}$=290 nm (chloroform)

Glass transition temperature analyzed by DSC: 230° C. (in a nitrogen atmosphere, rate of temperature increase 20° C./min)

Thermal decomposition temperature analyzed by TGA: 280° C. (in air, rate of temperature increase 20° C./min)

Molecular weight analyzed by GPC (solvent: THF, standard: polystyrene): Mw=9800, Mn=6490, Mw/Mn=1.51.

EXAMPLE 4

Synthesis of a Triazine Polymer Having Chromophore Residues Containing Azo Groups

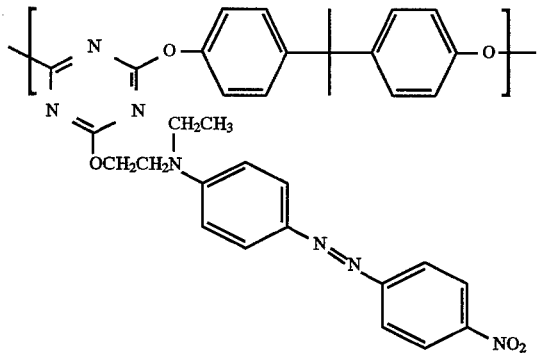

Bisphenol A (2.29 g) and an azo dye (Disperse Red 1, 3.15 g) were dissolved in dried tetrahydrofuran (100 ml). To the cooled solution (−70° C.), a hexane solution (1.6M) of butyl lithium (18.8 ml) was added dropwise over 10 min. The reaction mixture was stirred at −70° C. for 5 min. Subsequently, a 2,4,6-trichlorotriazine powder (1.84 g) was added to the stirred mixture. Following agitation for another 10 min at −70° C., the cooling bath was removed and the mixture was stirred at room temperature for 10 h. The agitation was continued at 50° C. for 6 h and refluxed for an additional 10 h. Thereafter, sodium (0.2 g) was dissolved in methanol (20 ml) to prepare sodium methoxide. A methanol solution of this sodium methoxide was added to the refluxed solution and the unreacted chloride atoms on the terminal triazine ring were replaced with a methoxy group. The resulting reaction solution was added dropwise to water and the mixture was filtered and washed with water to yield a solid product (4 g). The product was verified as the desired triazine polymer by elemental analysis and NMR.

UV-visible spectra: $\lambda_{max}$=480 nm (chloroform)

Glass transition temperature analyzed by DSC: 270° C. (in a nitrogen atmosphere, rate of temperature increase 20° C./min)

Thermal decomposition temperature analyzed by TGA: 300° C. (in air, rate of temperature increase 20° C./min)

Molecular weight analyzed by GPC (solvent: THF, standard: polystyrene): Mw=11000, Mn=7740, Mw/Mn=1.42.

The electro-optical constant (r) of this polymer at 633 nm was measured by the method described in Example 2 and it was found to be 25 pm/V.

The present invention provides triazine polymers that are suitable for use as nonlinear optical materials that are highly transparent, that permit the formation of high-quality films and that yet exhibit high heat resistance.

What is claimed is:

1. A polymer having triazine rings, which has a weight average molecular weight of 5,000 to 1,000,000 and has a recurring unit represented by the formula (I):

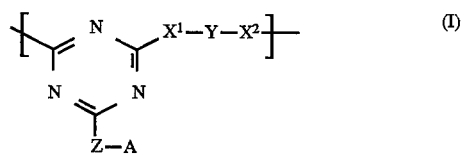

wherein $X^1$ and $X^2$ are independently S, $NR^1$ or O,
wherein $R^1$ is hydrogen atom, an alkyl group, straight chained or branched, having 1–12 carbon atoms, or an aryl group;

Y is an alkylene group, straight chained or branched, having 2–10 carbon atoms, a divalent substituted or unsubstituted aromatic ring group which does not have a chromophore moiety, a group in which said aromatic ring groups are together bonded or condensed, or a group represented by the formula (II):

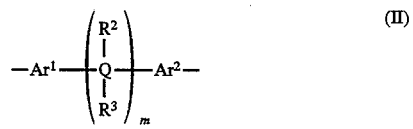

wherein $Ar^1$ and $Ar^2$ are independently a divalent substituted or unsubstituted aromatic ring group, $R^2$ and $R^3$ are independently hydrogen atom or an alkyl group, straight chained or branched, having 1–12 carbon atoms, Q is carbon atom or silicon atom, and m is an integer of 1 to 4;

Z is a spacer group comprising a group represented by the formula —G—$(CH_2)_n$—, or a direct bond,
wherein n is an integer of 1 to 10,
G is S, $NR^4$ or O wherein $R^4$ is hydrogen atom, an alkyl group, straight chained or branched, having 1–12 carbon atoms, or an aryl group;

A is an organic chromophore moiety in which an electron donative group and an electron attractive group are conjugated via a π-electron system with the proviso that if G is S then A is an organic chromophore moiety in which the electron donative group is selected from the group consisting of S, $NR^5$, and O wherein $R^5$ is a hydrogen atom, an alkyl group or an aryl group and the electron attractive group is selected from the group consisting of a nitro group, an acyl group, a cyano group, a sulfonyl group, a cyanovinyl group, and a dicyanovinyl group.

2. The polymer according to claim 1 wherein Z is —O—$(CH_2)_2$— or —O—$(CH_2)_3$—.

3. The polymer according to claim 1 wherein the electron donative group in A is S, $NR^5$ or O wherein $R^5$ is hydrogen atom, an alkyl group, straight chained or branched, having 1–12 carbon atoms, or an aryl group.

4. The polymer according to claim 1 wherein the electron attractive group in A is nitro, acyl, cyano, sulfonyl, cyanovinyl or dicyanovinyl group.

5. The polymer according to claim 1 wherein the π-electron system is represented by the formula —(Ar³—L)$_p$—Ar⁴— wherein Ar³ and Ar⁴ are independently a divalent substituted or unsubstituted aromatic ring group, L is an azo group, —N≡N—, —(CH=CH)$_q$— (wherein q is an integer of 1 to 5), —(C≡C)$_r$— (wherein r is an integer of 1 to 5), an aromatic ring group or a direct bond, and p is an integer of 0 to 10.

6. The polymer according to claim 1 wherein the ZA group is aminonitrostilbene or aminonitroazobenzene.

7. The polymer according to claim 1 wherein X¹ and X² are O.

8. The polymer according to claim 1 wherein Y is ethylene group or propylene group.

9. The polymer according to claim 1 wherein Y is phenylene group, pyrimidine group, pyrazine group, or 4,4'-(2, 5-pyriazinylene)-diphenyl group.

10. The polymer according to claim 1 wherein Y is a group represented by the formula:

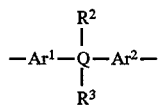

wherein

Ar¹ and Ar² are independently a divalent substituted or unsubstituted aromatic ring group, R² and R³ are independently hydrogen atom or an alkyl group, straight chained or branched, having 1–12 carbon atoms, Q is carbon atom or silicon atom.

11. The polymer according to claim 10 wherein R² and R³ are methyl groups.

12. The polymer according to claim 10 wherein Ar¹ and Ar² are phenylene groups.

13. The polymer according to claim 1 which is a homopolymer comprising a recurring unit represented by the formula (I).

14. The polymer according to claim 1 which is a copolymer comprising at least two recurring units represented by the formula (I).

15. The polymer according to claim 1 which is a copolymer comprising recurring units represented by the formula (I) and other recurring units selected from the group consisting of polyesters, polycarbonates, polyvinyl chloride, polyethers, polyacrylates, polymethacrylates, polystyrenes, polyolefins, and polyvinyl carbazole.

16. A nonlinear optical device comprising a polymer of claim 1.

17. The nonlinear optical device according to claim comprising a substrate having thereon a film of a polymer of claim 1.

* * * * *